(12) United States Patent
Ottewill (10) Patent No.: US 11,525,758 B2
(45) Date of Patent: Dec. 13, 2022

(54) METHOD AND APPARATUS FOR IDENTIFYING GEAR TOOTH NUMBERS IN A GEARBOX

(71) Applicant: ABB Schweiz AG, Baden (CH)

(72) Inventor: James Ottewill, Ruislip (GB)

(73) Assignee: ABB Schweiz AG, Baden (CH)

( * ) Notice: Subject to any disclaimer, the term of this patent is extended or adjusted under 35 U.S.C. 154(b) by 285 days.

(21) Appl. No.: 16/804,908

(22) Filed: Feb. 28, 2020

(65) Prior Publication Data
US 2020/0217753 A1 Jul. 9, 2020

Related U.S. Application Data

(63) Continuation of application No. PCT/EP2018/000337, filed on Jul. 3, 2018.

(30) Foreign Application Priority Data

Aug. 28, 2017 (EP) ..................................... 17460050

(51) Int. Cl.
*G01M 13/021* (2019.01)
*F16H 57/01* (2012.01)
*G01M 13/028* (2019.01)
*F16H 61/12* (2010.01)

(52) U.S. Cl.
CPC .......... *G01M 13/021* (2013.01); *F16H 57/01* (2013.01); *G01M 13/028* (2013.01); *F16H 2057/012* (2013.01); *F16H 2057/018* (2013.01); *F16H 2061/1208* (2013.01)

(58) Field of Classification Search
CPC ............... F16H 57/01; F16H 2057/012; F16H 2057/018; F16H 2061/1208; G01M 13/021; G01M 13/028
See application file for complete search history.

(56) References Cited

U.S. PATENT DOCUMENTS 4,055,998 A 11/1977 Pettingell et al.

OTHER PUBLICATIONS

European Patent Office, International Search Reports Written Opinion, dated Oct. 18, 2018. 9 Pages. Rijswijk, Netherlands, PCT/EP2018/000337.

(Continued)

*Primary Examiner* — Eric S. McCall
(74) *Attorney, Agent, or Firm* — Leydig, Voit & Mayer, Ltd.

(57) ABSTRACT

A method for identifying gear tooth numbers in a gearbox using data obtained from a vibration measuring device delivered to a data acquisition device and data delivered by a user to a computer device, comprising: processing data delivered by a user to the computer device, where the data comprises a gearbox ratio and a number of stages of a gearbox for calculating a potential gear tooth combination in each stage of a gearbox, calculating frequencies of characteristic features for each potential tooth combination using the data delivered at the processing data, measuring vibration signals of the gearbox, calculating a frequency spectrum from measured data delivered at the measuring, determining an amplitude of components, of the frequency spectrum delivered at the calculating a frequency spectrum at frequencies of characteristic features for each potential tooth combination delivered at the calculating frequencies of characteristic features.

12 Claims, 6 Drawing Sheets

(56) References Cited

OTHER PUBLICATIONS

Akao Yoshi Nori et al: "Estimation of Inkjet Printer Spur Gear Teeth Number from Pitch Data String of Limited Length", Aug. 13, 2009, ECCV 2016 Conference; [Lecture Notes in Computer Science; Lect.Notes Computer], Springer International Publishing, Cham, pp. 25-32, XP047389995,ISSN 0302-9743 1SBN: 978-3-642-33485-6.

| Number | Input Gear | Input Pinion | Output Gear | Output Pinion |
|---|---|---|---|---|
| 1 | 44 | 35 | 52 | 12 |
| 2 | 44 | 35 | 65 | 15 |
| 3 | 52 | 12 | 44 | 35 |
| 4 | 52 | 45 | 66 | 14 |
| 5 | 65 | 15 | 44 | 35 |
| 6 | 66 | 14 | 52 | 45 |
| 7 | 22 | 10 | 52 | 21 |
| 8 | 22 | 14 | 52 | 15 |
| 9 | 22 | 15 | 52 | 14 |
| 10 | 22 | 21 | 52 | 10 |
| 11 | 26 | 10 | 44 | 21 |
| 12 | 26 | 14 | 44 | 15 |
| 13 | 26 | 15 | 44 | 14 |
| 14 | 26 | 15 | 66 | 21 |
| 15 | 26 | 21 | 44 | 10 |
| 16 | 26 | 21 | 66 | 15 |
| 17 | 33 | 15 | 52 | 21 |
| 18 | 33 | 21 | 52 | 15 |
| 19 | 39 | 15 | 44 | 21 |
| 20 | 39 | 21 | 44 | 15 |
| 21 | 44 | 10 | 26 | 21 |
| 22 | 44 | 10 | 52 | 42 |
| 23 | 44 | 12 | 52 | 35 |
| 24 | 44 | 14 | 26 | 15 |
| 25 | 44 | 14 | 52 | 30 |
| ⋮ | | | | |
| 26 | 44 | 15 | 26 | 14 |
| 27 | 44 | 15 | 39 | 21 |
| 28 | 44 | 15 | 52 | 28 |
| 29 | 44 | 15 | 65 | 35 |
| 30 | 44 | 20 | 52 | 21 |
| 31 | 44 | 21 | 26 | 10 |
| 32 | 44 | 21 | 39 | 15 |
| 33 | 44 | 21 | 52 | 20 |
| 34 | 44 | 21 | 65 | 25 |
| 35 | 44 | 25 | 65 | 21 |
| 36 | 44 | 28 | 52 | 15 |
| 37 | 44 | 30 | 52 | 14 |
| 38 | 44 | 42 | 52 | 10 |
| 39 | 52 | 10 | 22 | 21 |
| 40 | 52 | 10 | 44 | 42 |
| 41 | 52 | 14 | 22 | 15 |
| 42 | 52 | 14 | 44 | 30 |
| 43 | 52 | 14 | 66 | 45 |
| 44 | 52 | 15 | 22 | 14 |
| 45 | 52 | 15 | 33 | 21 |
| 46 | 52 | 15 | 44 | 28 |
| 47 | 52 | 15 | 55 | 35 |
| 48 | 52 | 15 | 66 | 42 |
| 49 | 52 | 18 | 66 | 35 |
| 50 | 52 | 20 | 44 | 21 |
| ⋮ | | | | |

FIG. 3

| Number | 1st GMF | 1st GMF − Input Speed | 1st GMF + Input Speed | 1st GMF − Layshaft | 2 × 1st GMF | 3 × 1st GMF | 2nd GMF | 2nd GMF − Input Speed | 2ndGMF + Input Speed | 2nd GMF − Layshaft | 2 × 2nd GMF | 3 × 2nd GMF |
|---|---|---|---|---|---|---|---|---|---|---|---|---|
| 1 | 35 | 34 | 36 | 34.20 | 35.80 | 70 | 105 | 9.55 | 9.36 | 9.73 | 8.75 | 10.34 |
| 2 | 35 | 34 | 36 | 34.20 | 35.80 | 70 | 105 | 11.93 | 11.75 | 12.12 | 11.14 | 12.73 |
| 3 | 12 | 11 | 13 | 11.77 | 12.23 | 24 | 36 | 8.08 | 7.89 | 8.26 | 7.85 | 8.31 |
| 4 | 45 | 44 | 46 | 44.13 | 45.87 | 90 | 135 | 12.12 | 11.93 | 12.30 | 11.25 | 12.98 |
| 5 | 15 | 14 | 16 | 14.77 | 15.23 | 30 | 45 | 8.08 | 7.89 | 8.26 | 7.85 | 8.31 |
| 6 | 14 | 13 | 15 | 13.79 | 14.21 | 28 | 42 | 9.55 | 9.36 | 9.73 | 9.33 | 9.76 |
| 7 | 10 | 9 | 11 | 9.55 | 10.45 | 20 | 30 | 9.55 | 9.36 | 9.73 | 9.09 | 10 |
| 8 | 14 | 13 | 15 | 13.36 | 14.64 | 28 | 42 | 9.55 | 9.36 | 9.73 | 8.91 | 10.18 |
| 9 | 15 | 14 | 16 | 14.32 | 15.68 | 30 | 45 | 9.55 | 9.36 | 9.73 | 8.86 | 10.23 |
| 10 | 21 | 20 | 22 | 20.05 | 21.95 | 42 | 63 | 9.55 | 9.36 | 9.73 | 8.59 | 10.50 |
| 11 | 10 | 9 | 11 | 9.62 | 10.38 | 20 | 30 | 8.08 | 7.89 | 8.26 | 7.69 | 8.46 |
| 12 | 14 | 13 | 15 | 13.46 | 14.54 | 28 | 42 | 8.08 | 7.89 | 8.26 | 7.54 | 8.62 |
| 13 | 15 | 14 | 16 | 14.42 | 15.58 | 30 | 45 | 8.08 | 7.89 | 8.26 | 7.50 | 8.65 |
| 14 | 15 | 14 | 16 | 14.42 | 15.58 | 30 | 45 | 12.12 | 11.93 | 12.30 | 11.54 | 12.69 |
| 15 | 21 | 20 | 22 | 20.19 | 21.81 | 42 | 63 | 8.08 | 7.89 | 8.26 | 7.27 | 8.88 |
| 16 | 21 | 20 | 22 | 20.19 | 21.81 | 42 | 63 | 12.12 | 11.93 | 12.30 | 11.31 | 12.92 |
| 17 | 15 | 14 | 16 | 14.55 | 15.45 | 30 | 45 | 9.55 | 9.36 | 9.73 | 9.09 | 10 |
| 18 | 21 | 20 | 22 | 20.36 | 21.64 | 42 | 63 | 9.55 | 9.36 | 9.73 | 8.91 | 10.18 |
| 19 | 15 | 14 | 16 | 14.62 | 15.38 | 30 | 45 | 8.08 | 7.89 | 8.26 | 7.69 | 8.46 |
| 20 | 21 | 20 | 22 | 20.46 | 21.54 | 42 | 63 | 8.08 | 7.89 | 8.26 | 7.54 | 8.62 |
| 21 | 10 | 9 | 11 | 9.77 | 10.23 | 20 | 30 | 4.77 | 4.59 | 4.96 | 4.55 | 5 |
| 22 | 10 | 9 | 11 | 9.77 | 10.23 | 20 | 30 | 9.55 | 9.36 | 9.73 | 9.32 | 9.77 |
| 23 | 12 | 11 | 13 | 11.73 | 12.27 | 24 | 36 | 9.55 | 9.36 | 9.73 | 9.27 | 9.82 |
| 24 | 14 | 13 | 15 | 13.68 | 14.32 | 28 | 42 | 4.77 | 4.59 | 4.96 | 4.45 | 5.09 |
| 25 | 14 | 13 | 15 | 13.68 | 14.32 | 28 | 42 | 9.55 | 9.36 | 9.73 | 9.23 | 9.86 |
| 26 | 15 | 14 | 16 | 14.66 | 15.34 | 30 | 45 | 4.77 | 4.59 | 4.96 | 4.43 | 5.11 |
| 27 | 15 | 14 | 16 | 14.66 | 15.34 | 30 | 45 | 7.16 | 6.98 | 7.34 | 6.82 | 7.50 |
| 28 | 15 | 14 | 16 | 14.66 | 15.34 | 30 | 45 | 9.55 | 9.36 | 9.73 | 9.20 | 9.89 |
| 29 | 15 | 14 | 16 | 14.66 | 15.34 | 30 | 45 | 11.93 | 11.75 | 12.12 | 11.59 | 12.27 |
| 30 | 20 | 19 | 21 | 19.55 | 20.45 | 40 | 60 | 9.55 | 9.36 | 9.73 | 9.09 | 10 |
| 31 | 21 | 20 | 22 | 20.52 | 21.48 | 42 | 63 | 4.77 | 4.59 | 4.96 | 4.30 | 5.25 |
| 32 | 21 | 20 | 22 | 20.52 | 21.48 | 42 | 63 | 7.16 | 6.98 | 7.34 | 6.68 | 7.64 |
| 33 | 21 | 20 | 22 | 20.52 | 21.48 | 42 | 63 | 9.55 | 9.36 | 9.73 | 9.07 | 10.02 |
| 34 | 21 | 20 | 22 | 20.52 | 21.48 | 42 | 63 | 11.93 | 11.75 | 12.12 | 11.45 | 12.41 |
| 35 | 25 | 24 | 26 | 24.43 | 25.57 | 50 | 75 | 11.93 | 11.75 | 12.12 | 11.36 | 12.50 |
| 36 | 28 | 27 | 29 | 27.36 | 28.64 | 56 | 84 | 9.55 | 9.36 | 9.73 | 8.91 | 10.18 |
| 37 | 30 | 29 | 31 | 29.32 | 30.68 | 60 | 90 | 9.55 | 9.36 | 9.73 | 8.86 | 10.23 |
| 38 | 42 | 41 | 43 | 41.05 | 42.95 | 84 | 126 | 9.55 | 9.36 | 9.73 | 8.59 | 10.50 |
| 39 | 10 | 9 | 11 | 9.81 | 10.19 | 20 | 30 | 4.04 | 3.85 | 4.22 | 3.85 | 4.23 |
| 40 | 10 | 9 | 11 | 9.81 | 10.19 | 20 | 30 | 8.08 | 7.89 | 8.26 | 7.88 | 8.27 |
| 41 | 14 | 13 | 15 | 13.73 | 14.27 | 28 | 42 | 4.04 | 3.85 | 4.22 | 3.77 | 4.31 |
| 42 | 14 | 13 | 15 | 13.73 | 14.27 | 28 | 42 | 8.08 | 7.89 | 8.26 | 7.81 | 8.35 |
| 43 | 14 | 13 | 15 | 13.73 | 14.27 | 28 | 42 | 12.12 | 11.93 | 12.30 | 11.85 | 12.38 |
| 44 | 15 | 14 | 16 | 14.71 | 15.29 | 30 | 45 | 4.04 | 3.85 | 4.22 | 3.75 | 4.33 |
| 45 | 15 | 14 | 16 | 14.71 | 15.29 | 30 | 45 | 6.06 | 5.87 | 6.24 | 5.77 | 6.35 |
| 46 | 15 | 14 | 16 | 14.71 | 15.29 | 30 | 45 | 8.08 | 7.89 | 8.26 | 7.79 | 8.37 |
| 47 | 15 | 14 | 16 | 14.71 | 15.29 | 30 | 45 | 10.10 | 9.91 | 10.28 | 9.81 | 10.38 |
| 48 | 15 | 14 | 16 | 14.71 | 15.29 | 30 | 45 | 12.12 | 11.93 | 12.30 | 11.83 | 12.40 |
| 49 | 18 | 17 | 19 | 17.65 | 18.35 | 36 | 54 | 12.12 | 11.93 | 12.30 | 11.77 | 12.46 |
| 50 | 20 | 19 | 21 | 19.62 | 20.38 | 40 | 60 | 8.08 | 7.89 | 8.26 | 7.69 | 8.46 |

FIG. 4

| Combination | 1st GMF | 1st GMF − Input Speed | 1st GMF + Input Speed | 1st GMF − Layshaft | 2 × 1st GMF | 3 × 1st GMF | 2nd GMF | 2nd GMF − Input Speed | 2ndGMF + Input Speed | 2nd GMF − Layshaft | 2 × 2nd GMF | 3 × 2nd GMF | Sum of All Features |
|---|---|---|---|---|---|---|---|---|---|---|---|---|---|
| 1 | 2.11 | 4.31 | 2.12 | 1.55 | 1.69 | 2.49 | 3.03 | 9.81 | 2.79 | 1.06 | 1.14 | 2.06 | 42.7 |
| 2 | 2.11 | 4.31 | 2.12 | 1.55 | 1.69 | 2.49 | 3.03 | 0.83 | 1.05 | 0.47 | 0.60 | 1.93 | 25.2 |
| 3 | 1.18 | 0.87 | 3.31 | 0.82 | 1.01 | 8.16 | 2.12 | 1.22 | 0.52 | 0.68 | 0.39 | 0.52 | 24.8 |
| 4 | 2.08 | 2.23 | 1.56 | 2.85 | 1.62 | 1.52 | 0.10 | 0.47 | 0.83 | 1.50 | 1.12 | 0.44 | 19.8 |
| 5 | 0.89 | 1.55 | 1.93 | 1.26 | 0.85 | 1.67 | 2.08 | 1.22 | 0.52 | 0.68 | 0.39 | 0.52 | 17.6 |
| 6 | 1.55 | 3.31 | 0.89 | 0.67 | 1.20 | 5.54 | 3.96 | 9.81 | 2.79 | 1.06 | 0.95 | 0.65 | 40.9 |
| 7 | 1.58 | 2.59 | 0.87 | 9.81 | 0.79 | 0.99 | 1.67 | 9.81 | 2.79 | 1.06 | 1.13 | 1.58 | 43.2 |
| 8 | 1.55 | 3.31 | 0.89 | 1.45 | 1.47 | 5.54 | 3.96 | 9.81 | 2.79 | 1.06 | 1.69 | 0.93 | 43.0 |
| 9 | 0.89 | 1.55 | 1.93 | 2.13 | 1.63 | 1.67 | 2.08 | 9.81 | 2.79 | 1.06 | 0.53 | 0.80 | 35.4 |
| 10 | 2.12 | 0.99 | 5.31 | 0.73 | 1.32 | 3.96 | 3.85 | 9.81 | 2.79 | 1.06 | 0.66 | 2.01 | 43.2 |
| 11 | 1.58 | 2.59 | 0.87 | 1.11 | 1.83 | 0.99 | 1.67 | 1.22 | 0.52 | 0.68 | 0.81 | 1.00 | 18.9 |
| 12 | 1.55 | 3.31 | 0.89 | 1.85 | 0.82 | 5.54 | 3.96 | 1.22 | 0.52 | 0.68 | 0.68 | 0.77 | 25.8 |
| 13 | 0.89 | 1.55 | 1.93 | 0.64 | 1.39 | 1.67 | 2.08 | 1.22 | 0.52 | 0.68 | 0.54 | 0.79 | 18.0 |
| 14 | 0.89 | 1.55 | 1.93 | 0.64 | 1.39 | 1.67 | 2.08 | 0.47 | 0.83 | 1.50 | 0.97 | 0.44 | 17.9 |
| 15 | 2.12 | 0.99 | 5.31 | 1.24 | 1.01 | 3.96 | 3.85 | 1.22 | 0.52 | 0.68 | 1.25 | 1.01 | 27.2 |
| 16 | 2.12 | 0.99 | 5.31 | 1.24 | 1.01 | 3.96 | 3.85 | 0.47 | 0.83 | 1.50 | 1.49 | 1.44 | 27.7 |
| 17 | 0.89 | 1.55 | 1.93 | 0.82 | 0.92 | 1.67 | 2.08 | 9.81 | 2.79 | 1.06 | 1.13 | 1.58 | 34.8 |
| 18 | 2.12 | 0.99 | 5.31 | 1.44 | 1.60 | 3.96 | 3.85 | 9.81 | 2.79 | 1.06 | 1.69 | 0.93 | 44.1 |
| 19 | 0.89 | 1.55 | 1.93 | 1.00 | 0.90 | 1.67 | 2.08 | 1.22 | 0.52 | 0.68 | 0.81 | 1.00 | 18.3 |
| 20 | 2.12 | 0.99 | 5.31 | 0.88 | 1.51 | 3.96 | 3.85 | 1.22 | 0.52 | 0.68 | 0.68 | 0.77 | 26.6 |
| 21 | 1.58 | 2.59 | 0.87 | 1.09 | 0.80 | 0.99 | 1.67 | 0.28 | 0.91 | 0.52 | 0.35 | 1.81 | 25.4 |
| 22 | 1.58 | 2.59 | 0.87 | 1.09 | 0.80 | 0.99 | 1.67 | 9.81 | 2.79 | 1.06 | 1.70 | 1.09 | 34.6 |
| 23 | 1.18 | 0.87 | 3.31 | 1.66 | 1.07 | 8.16 | 2.12 | 9.81 | 2.79 | 1.06 | 2.83 | 1.76 | 45.2 |
| 24 | 1.55 | 3.31 | 0.89 | 1.35 | 2.13 | 5.54 | 3.96 | 0.28 | 0.91 | 0.52 | 0.35 | 0.67 | 33.4 |
| 25 | 1.55 | 3.31 | 0.89 | 1.35 | 2.13 | 5.54 | 3.96 | 9.81 | 2.79 | 1.06 | 1.13 | 0.76 | 42.8 |
| 26 | 0.89 | 1.55 | 1.93 | 1.66 | 1.29 | 1.67 | 2.08 | 0.28 | 0.91 | 0.52 | 0.26 | 0.40 | 25.3 |
| 27 | 0.89 | 1.55 | 1.93 | 1.66 | 1.29 | 1.67 | 2.08 | 0.61 | 1.40 | 0.63 | 1.47 | 0.54 | 18.5 |
| 28 | 0.89 | 1.55 | 1.93 | 1.66 | 1.29 | 1.67 | 2.08 | 9.81 | 2.79 | 1.06 | 0.90 | 2.08 | 36.3 |
| 29 | 0.89 | 1.55 | 1.93 | 1.66 | 1.29 | 1.67 | 2.08 | 0.83 | 1.05 | 0.47 | 1.63 | 1.07 | 19.2 |
| 30 | 0.99 | 1.81 | 2.12 | 0.87 | 1.34 | 1.80 | 3.94 | 9.81 | 2.79 | 1.06 | 1.13 | 1.58 | 37.8 |
| 31 | 2.12 | 0.99 | 5.31 | 1.03 | 0.64 | 3.96 | 3.85 | 0.28 | 0.91 | 0.52 | 0.70 | 0.40 | 32.6 |
| 32 | 2.12 | 0.99 | 5.31 | 1.03 | 0.64 | 3.96 | 3.85 | 0.61 | 1.40 | 0.63 | 1.24 | 0.90 | 25.4 |
| 33 | 2.12 | 0.99 | 5.31 | 1.03 | 0.64 | 3.96 | 3.85 | 9.81 | 2.79 | 1.06 | 1.09 | 1.32 | 42.5 |
| 34 | 2.12 | 0.99 | 5.31 | 1.03 | 0.64 | 3.96 | 3.85 | 0.83 | 1.05 | 0.47 | 0.72 | 0.85 | 24.9 |
| 35 | 1.15 | 8.16 | 4.45 | 1.77 | 0.94 | 1.61 | 2.23 | 0.83 | 1.05 | 0.47 | 1.14 | 0.82 | 27.7 |
| 36 | 5.54 | 8.71 | 5.58 | 1.98 | 2.33 | 8.52 | 2.55 | 9.81 | 2.79 | 1.06 | 1.69 | 0.93 | 60.0 |
| 37 | 1.67 | 5.58 | 3.08 | 0.92 | 1.65 | 3.94 | 1.52 | 9.81 | 2.79 | 1.06 | 0.53 | 0.80 | 41.9 |
| 38 | 3.96 | 1.63 | 2.56 | 1.75 | 1.09 | 2.55 | 0.31 | 9.81 | 2.79 | 1.06 | 0.66 | 2.01 | 38.7 |
| 39 | 1.58 | 2.59 | 0.87 | 0.73 | 1.49 | 0.99 | 1.67 | 0.56 | 0.45 | 0.36 | 0.31 | 0.26 | 13.5 |
| 40 | 1.58 | 2.59 | 0.87 | 0.73 | 1.49 | 0.99 | 1.67 | 1.22 | 0.52 | 0.68 | 0.72 | 0.86 | 18.0 |
| 41 | 1.55 | 3.31 | 0.89 | 1.46 | 1.21 | 5.54 | 3.96 | 0.56 | 0.45 | 0.36 | 0.68 | 0.36 | 22.0 |
| 42 | 1.55 | 3.31 | 0.89 | 1.46 | 1.21 | 5.54 | 3.96 | 1.22 | 0.52 | 0.68 | 0.39 | 1.37 | 26.0 |
| 43 | 1.55 | 3.31 | 0.89 | 1.46 | 1.21 | 5.54 | 3.96 | 0.47 | 0.83 | 1.50 | 0.94 | 1.41 | 26.6 |
| 44 | 0.89 | 1.55 | 1.93 | 1.07 | 0.81 | 1.67 | 2.08 | 0.56 | 0.45 | 0.36 | 0.48 | 0.29 | 13.8 |
| 45 | 0.89 | 1.55 | 1.93 | 1.07 | 0.81 | 1.67 | 2.08 | 1.24 | 1.51 | 0.65 | 0.52 | 0.94 | 16.2 |
| 46 | 0.89 | 1.55 | 1.93 | 1.07 | 0.81 | 1.67 | 2.08 | 1.22 | 0.52 | 0.68 | 1.18 | 1.13 | 18.8 |
| 47 | 0.89 | 1.55 | 1.93 | 1.07 | 0.81 | 1.67 | 2.08 | 2.06 | 1.51 | 1.80 | 0.73 | 1.83 | 21.0 |
| 48 | 0.89 | 1.55 | 1.93 | 1.07 | 0.81 | 1.67 | 2.08 | 0.47 | 0.83 | 1.50 | 0.71 | 1.02 | 18.0 |
| 49 | 1.28 | 5.48 | 1.81 | 2.27 | 6.41 | 2.12 | 4.49 | 0.47 | 0.83 | 1.50 | 0.82 | 0.58 | 31.5 |
| 50 | 0.99 | 1.81 | 2.12 | 0.64 | 0.71 | 1.80 | 3.94 | 1.22 | 0.52 | 0.68 | 0.81 | 1.00 | 20.6 |

METHOD AND APPARATUS FOR IDENTIFYING GEAR TOOTH NUMBERS IN A GEARBOX

The subject of the invention is a method and an apparatus for identifying gear tooth numbers in a gearbox for giving an estimation of the most likely tooth numbers for all of the gears in a gearbox, purely on the basis of measured dynamic signals and total ratio of the gearbox. These parameters may subsequently be utilized in diagnostic algorithms known in the state of the art such as spectral analysis, shaft order analysis or synchronous signal averaging, in order to extract diagnostic information about the gearbox.

BACKGROUND OF THE INVENTION

Gearboxes represent one of the most critical elements of rotating machinery in use today. As such, numerous condition monitoring approaches have been developed for assessing the health of gearboxes on the basis of, for example, measured vibrations, particle matter in lubricating oil and motor current. Fundamentally, diagnostics relies on knowing signal patterns relating to healthy operation, identifying deviations away from these healthy patterns and associating these deviations to a particular operating condition. In a gearbox, the nominally healthy patterns in measured dynamic signals (e.g. vibrations) are due primarily to the stiffness variation which caused by the varying number of teeth in mesh at any one time. This leads to the so-called gear mesh frequency, equal to the number of teeth on a gear, multiplied by its rotation speed. Gear faults act to modulate the dynamic component relating to this gear mesh frequency, for example tooth wear, eccentricity and misalignments will result in sidebands of the gear mesh frequency. As a result, in order to diagnose many fault conditions, knowledge of the number of teeth on each of the gears in the gearbox is necessary.

Unfortunately, gear tooth numbers are often not readily available. This is particularly true in the case of older gearboxes, which are no longer commercially available, and for which hard-copies of technical documentation have been lost. As these older gearboxes have typically been in operation for long periods of time, they represent systems where condition monitoring may potentially offer the greatest benefit (e.g. providing input on decisions to refit or replace a gearbox, or to simply allow it to continue running). As such, a method for estimating the number of teeth in a gearbox purely on the basis of simple nameplate data and non-invasive measurements is highly desirable.

Patent Application CN 101216090 A describes a method for designing a planetary gearbox, specifically for determining the optimal tooth numbers in a planetary gearboxes, by (1) estimating a theoretical transmission ratio according to design conditions; (2) determining the number of teeth in the sun gear, as well as the number of teeth on the planetary gears; (3) judging whether the combination of sun gear teeth and planetary gear teeth is feasible from an assembly point of view; (4) updating the number of teeth estimated on the sun gear according to application requirements (e.g. loading); (5) updating the number of teeth on the planets according to the updated number of teeth on the sun gear; (6) judging whether the transmission ratio estimated from the updated number of teeth on the sun gear and the planets meets design requirements, if no return to step (2), otherwise; (7) analyzing the vibration performance of the system in order to ascertain whether a harmonic resonance would be excited, if yes return to step (2) otherwise take the tooth numbers proposed as the final result. This application is aimed at identifying the optimum design of a new gearbox, as opposed to estimating the number of teeth in a gearbox already in the field.

Journal publication "Parameter identification and slip estimation of induction machine" by Orman et al. (Orman, M., Orkisz, M. and Pinto, C. T., 2011. Parameter identification and slip estimation of induction machine. Mechanical Systems and Signal Processing, 25(4), pp. 1408-1416) describes the identification of parameters (for example the number of rotor slots) and speed of an electric motor. The analysis is based on finding the parameter set which best matches the components observed in the frequency spectrum of measured stator currents. The approach given in this paper is focused on the analysis of motors as opposed to gearboxes.

Journal publication "Estimation of Inkjet Printer Spur Gear Teeth Number from Pitch Data String of Limited Length" by Yoshinori Akao, Atsushi Yamamoto and Yoshiyasu Higashikawa (National Research Institute of Police Science, Kashiwa, Chiba 2770883), 13 Aug. 2009, ECCV 2016 Conference (lecture notes in computer science, Springer International Publishing, Cham, pages 25-32) describes the feasibility of estimating the number of inkjet printer spur gear teeth from pitch data strings of limited length by maximum entropy spectral analysis. The positions of spur marks, formed on pressure sensitive film as it was passed through an inkjet printer by a spur gear feeding mechanism, were measured using a microscope. These positions were subsequently used to evaluate the pitch of the gears in the feeding mechanism. This information was subsequently evaluated via a maximum entropy spectrum method to estimate the most likely number of teeth in the feeding spur gear. Focused on the specific case of inkjet printers, the approach is not applicable to the general case of gearbox tooth estimation as it relies on the evaluation of spur marks formed on documents by a feeding mechanism. In contrast to the invention proposed here, the method described in the publication is invasive requiring that the sensor has physical contact with the gears themselves. This is not appropriate in typical gearboxes with the gears inaccessible inside the gearbox casing.

From U.S. Pat. No. 4,055,998 there is known waveform count of teeth on an internal combustion engine flywheel. The invention provides alternative use of engine cycle identification signals or engine tooth waveform analysis to measure the number of teeth on the flywheel. The invention is based on the analysis of time intervals between the passage of teeth on a flywheel. A tooth sensing means is required in order to realize the invention. Often such tooth sensing means are not available in existing gearboxes. Furthermore, installing such tooth sensing means, as well as being invasive, would defeat one of the purposes of the invention under consideration, as it would imply that the user has access to, and may open the gearbox, allowing tooth numbers to be explicitly counted. This is in contrast to the invention described in this document.

SUMMARY OF THE INVENTION

The essence of the invention is presented in claims 1-13.

ADVANTAGES OF THE INVENTION

The inventive method gives an estimation of the most likely tooth numbers for all of the gears in a gearbox, purely on the basis of measured dynamic signals and nameplate values of the gearbox under consideration (gearbox ratio and number of stages). Specifically, the developed algorithm involves the calculation of all feasible tooth combinations that can lead to the reported gearbox ratio, before identifying which of these tooth combinations would most likely lead to dynamic patterns that best match what is observed in the measured dynamic signals. The most likely tooth combination is used in subsequent analysis of the gearbox. These parameters may subsequently be utilized in diagnostic algorithms known in the state of the art such as spectral analysis, shaft order analysis or synchronous signal averaging, in order to extract diagnostic information about the gearbox.

BRIEF DESCRIPTION OF THE DRAWINGS

FIG. 4 presents a table showing calculated characteristic frequencies given in terms of shaft orders for the top 50 feasible tooth combinations for the example test case gearbox combinations which most closely match the reported gear ratio, with the correct combination being highlighted;

FIG. 5 presents a table showing amplitudes of the order domain spectrum at characteristic frequencies for the top 50 feasible tooth combinations for the example test case gearbox combinations which most closely match the reported gear ratio, with the correct combination is highlighted and the summation of all values for each tooth combination provided;

DETAILED DESCRIPTION OF THE INVENTION

Figure 1:
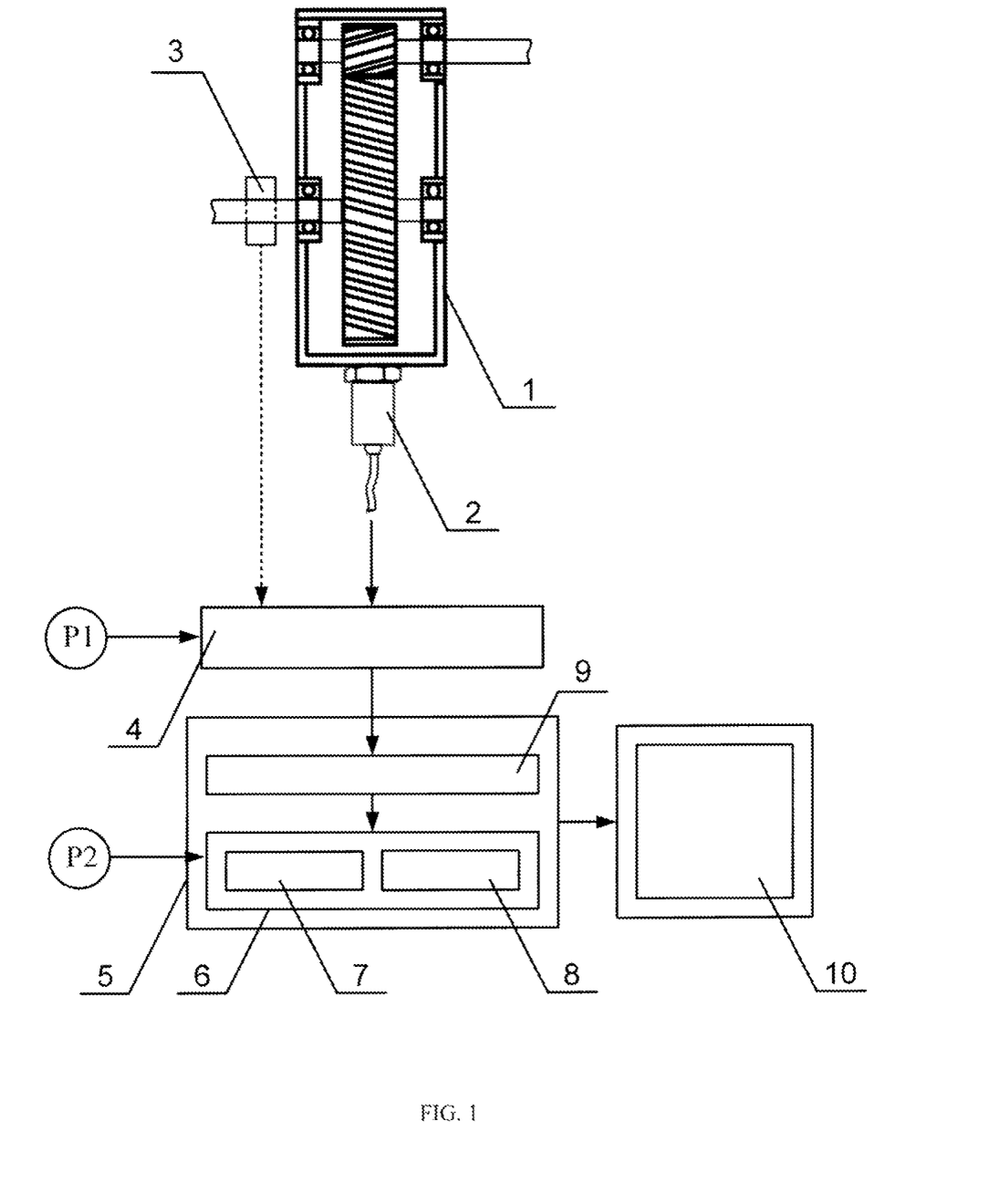
FIG. 1 is a schematic of a physical realization of the invention

Referring to FIG. 1 there is depicted an example schematic of a physical realization of the invention. A gearbox 1 forms part of a piece of rotating machinery, with other elements in the machinery not being depicted. Vibrations are recorded from gearbox 1 using one or more vibration measuring devices 2 known in the state of the art. The outputs of the one or more vibration measuring devices 2 are connected to a data acquisition unit 4. A measure of the angular displacement (or its derivatives) recorded from a shaft mounted transducer 3 (e.g. encoder) may also be is supplied to the data acquisition unit 4. In FIG. 1 the measured angular displacement is indicated by a dashed line because in the second embodiment of the invention this measurement is omitted. The data acquisition unit 4, which typically takes the form of an analog-to-digital converter is provided with a set of constant parameters P1, which characterize the process of converting the analog waveforms into the discrete signals, specifically the sampling rate and the length of the signal subjected to conversion. The data acquisition unit 4 is connected to a computer device 5, with a data processing unit 6 and communication module 9. In the data processing unit 6 a data storage module 7 and a gearbox tooth estimation module 8 are implemented. Some other modules which are necessary for processing and calculating data, not presented in the drawing, are also implemented in the processor. A parameter set P2, comprising consisting of the gearbox ratio and number of stages of the gearbox is supplied to the computer device 5, and is stored in the memory for use in subsequent steps. Furthermore, the computer device 5 contains memories RAM and ROM, which are also not presented in the drawing. The computer device 5 is connected to an output unit 10 in which the results of the condition monitoring are presented to the user. The output unit 10 could be a monitor, a printer or any useful device for presentation of the results of the invention. Additionally, the output unit 10 may be an additional module fibs performing diagnostics algorithms for monitoring the health of the gearbox using methods known in the state of the art. The data acquisition unit 4 or an output unit 10 may be placed in a computer device 5 which is not presented in the drawing.

Figure 2:
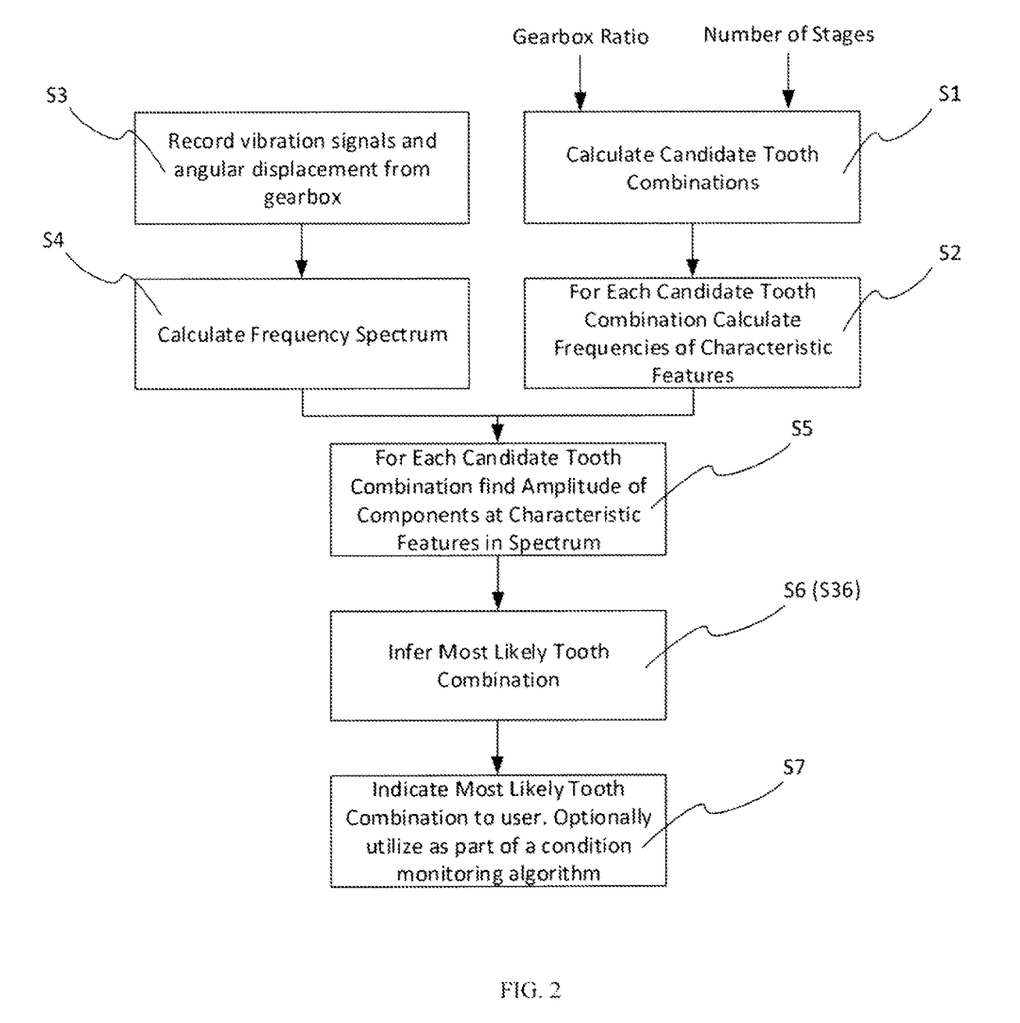
FIG. 2 presents a diagram of operations performed showing the steps taken in the first embodiment of the invention.

The first embodiment of the inventive method is implemented according to the steps S1-S7 shown in FIG. 2. The second embodiment of the inventive method is implemented according to the steps S21-S27 shown in FIG. 6.

Step S1

With reference to the system shown in FIG. 1, at Step 1 the user inputs the total gear ratio of the gearbox and the number of gear stages, typically found on the nameplate of the gearbox. If known, further information about the gearbox might also be input (e.g. nominal loading, gear types, pressure angles, materials etc.). This information forms parameter set P2 which is supplied to the computer device 5. On the basis of this information all potential gear tooth number combinations are calculated and ranked according to likelihood of being the true gear tooth combination. The process of ranking the potential gear tooth numbers may be based on empirical probabilities (i.e. identifying the most likely gear tooth combinations on the basis of the most commonly seen gear tooth combinations in practice), or on the basis of combinations which lead to a gear ratio which most closely agrees with that which is reported on the nameplate. Furthermore, certain tooth combinations might be discarded, or given a reduced likelihood weighting according to knowledge of best practices typically applied when designing gearboxes. Examples of assumptions of best practices might include A pinion (the smaller of the two gears in a meshing pair) will have a minimum number (e.g. 5) and a maximum number (e.g. 50) of possible teeth. This might be guided by size/pressure angle/loading considerations.

Similarly, a gear (the larger of the two gears in a meshing pair) can have a minimum of 30 teeth and a maximum of 150 teeth. Again, this might be guided by size/pressure angle/loading considerations.

Standard gear sizes (module) are more likely to be used.

Meshing gears will have the same module.

The shaft speeds are monotonically decreasing from the high speed side to the low speed side (i.e. there is not a speed increasing stage followed by a speed reducing stage). We retain the possibility to have a unity gear ratio in one stage.

To ensure that wear is uniformly distributed across gear teeth, the number of teeth on mating gears are prime to one another (i.e. no common factors).

Note that these represent examples of design choices that might be considered when discriminating between gear tooth combinations, and that other assumptions known by those skilled in the state of the art might also be considered. These assumptions and knowledge of the reported gearbox ratio and the number of gear stages may be utilized to calculate all potential tooth numbers on each gear and rank them according to how likely they are to be the true gear ratio. The output of Step S1 is a list of potential gear tooth numbers ordered according to the probability that they are the correct combination. Potentially, to reduce computational burden, the list of potential gear tooth numbers may be restricted to a user defined number of potential tooth combinations, input as a further value in parameter set P2 which is supplied to the computer device 5.

In order to illustrate the implementation of Step S1, as well as subsequent steps, consider an example test case gearbox consisting of two gear stages. The example test case gearbox contains four helical gears and has a nameplate gearbox ratio of 5.4476. Mounted on the input shaft of the gearbox is a helical pinion gear with 28 teeth. This gear meshes with a helical gear with 44 teeth mounted on the lay shaft of the gearbox. Together the 28 tooth pinion and the 44 tooth gear form the first stage of the gearbox. Also mounted on the lay shaft is a 15 tooth helical pinion gear. This 15 tooth helical pinion gear meshes with a 52 tooth helical gear mounted on the output shaft of the gearbox. Together the 15 tooth helical pinion gear and the 52 tooth helical gear form the second stage of the gearbox.

With reference to the example test case gearbox, in Step S1, the nameplate gearbox ratio of 5.4476 and the known number of stages, 2 is supplied to the computer device 5 as part of parameters set P2. Using this information all potential gear tooth combinations are calculated iteratively, assuming bounds of:

5≤No Teeth on Stage 1 Pinion≤30
30≤No Teeth on Stage 1 Gear≤150
5≤No Teeth on Stage 2 Pinion≤30
30≤No Teeth on Stage 2 Gear≤150

For each potential tooth combination the resulting gearbox ratio is calculated using basic equations known in the state of the art. For the example test case gearbox, the gearbox ratio of the $k^{th}$ potential tooth combination is calculated using $$R(k) = \frac{N_1(k)}{N_2(k)} \frac{N_3(k)}{N_4(k)},$$

Where:
$R(k)$ is the gearbox ratio of the $k^{th}$ potential tooth combination
$N_1(k)$ is the number of teeth on the gear mounted on input shaft of the gearbox, for combination, k
$N_2(k)$ is the number of teeth on the gear mounted on lay shaft of the gearbox, meshing with the gear mounted on input shaft of the gearbox for combination k
$N_3(k)$ is the number of teeth on the gear mounted on lay shaft of the gearbox, meshing with the gear mounted on output shaft of the gearbox for combination k
$N_4(k)$ is the number of teeth on the gear mounted on output shaft of the gearbox, meshing with the gear mounted on lay shaft of the gearbox for combination k Those skilled in the state of the art will recognize that, depending on the numbers of stages in the gearbox, this equation will include either additional or fewer terms.

The potential tooth combinations are subsequently ranked according to how closely the gearbox ratio calculated from the potential tooth combination agrees with the nameplate gearbox ratio, calculated according to $$\text{Score}(k) = |R(k) - R_{nameplate}|,$$

Figure 3:
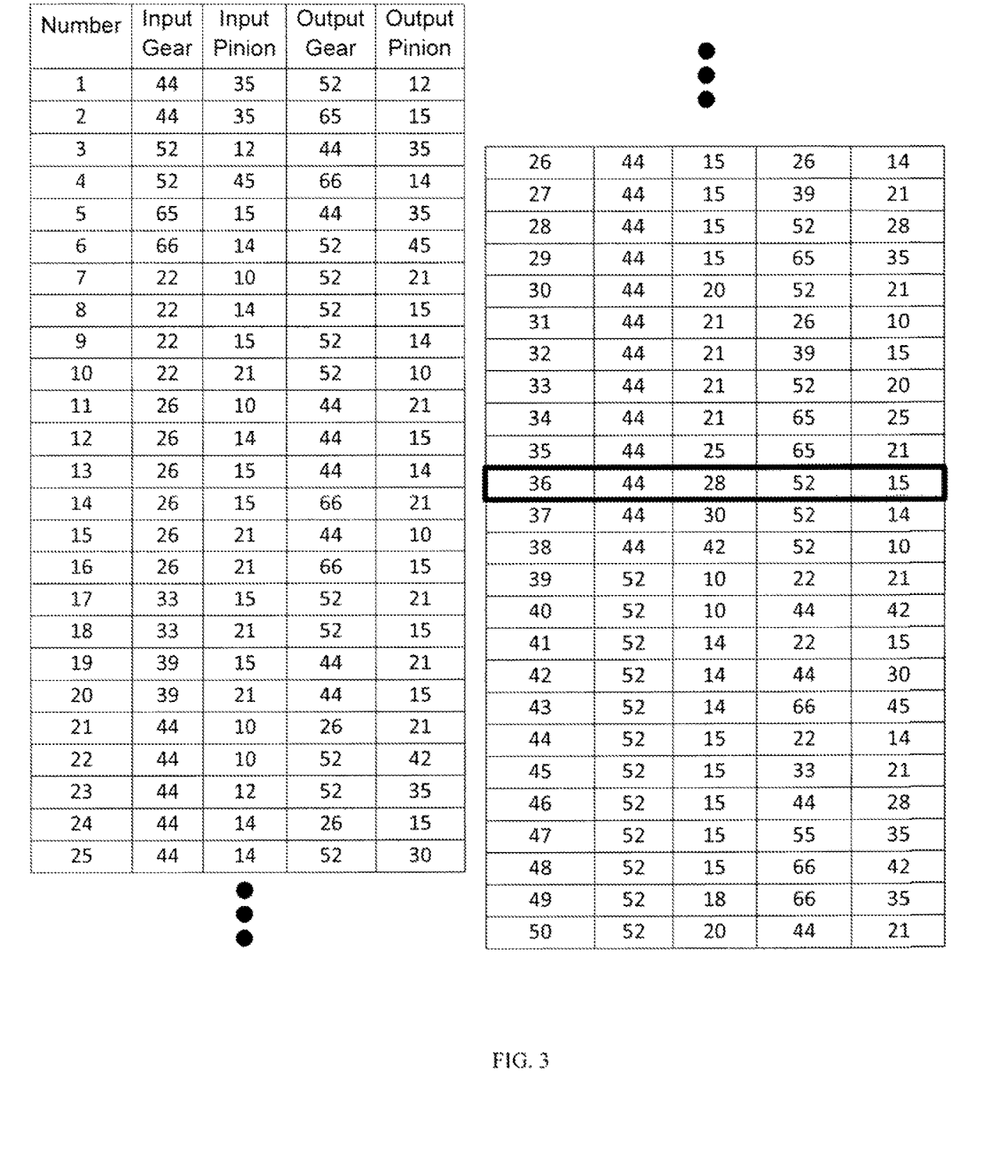
FIG. 3 presents a table showing feasible tooth combinations for the example test case gearbox with the top 50 combinations which most closely match the reported gear ratio being shown and the true combination being highlighted.

Where:
Score(k) is the absolute difference between the gearbox ratio calculated for the $k^{th}$ potential tooth combination and the nameplate gearbox ratio
$R(k)$ is the gearbox ratio of the $k^{th}$ potential tooth combination
$R_{nameplate}$ is the nameplate gearbox ratio FIG. 3 shows the 50 tooth combinations which most closely agreed with the nameplate. Note that highlighted tooth combination number 36, represents the true combination for the example test case gearbox.

Step S2

At Step S2, for each potential tooth combination the predicted gear mesh frequencies are calculated. Other characteristic frequencies such as shaft rotation speeds and sidebands of the predicted gear mesh frequencies might also be considered. The output of this step is a vector of frequencies at which characteristic features appear, which were denote the characteristic frequencies for each potential gear tooth combination.

Considering the example test case gearbox, at the Step S2, each of the 50 tooth combinations which most closely agreed with the nameplate gearbox ratio are used to calculate frequencies at which characteristic features occurred. The selected features included the gear mesh frequencies (GMFs), their harmonics and sidebands at the shaft rotation speeds. FIG. 4 shows the characteristic frequencies for the 50 tooth combinations first given in FIG. 3. Frequencies are given in terms of multiples of the rotation speed of the input shaft, henceforth referred to as shaft orders.

Step S3

In Step S3 one or more vibration signals are recorded using vibration sensors known in the state of the art (e.g. accelerometers, velocity transducers, proximity probes, etc.). Typically recording 10 seconds of data at approximately 12500 Hz sampling rate should be sufficient to perform the analyses. Also at Step S3, the angular displacement of at least one of the gearbox stages is recorded using sensors known in the state of the art (e.g. encoders, tachometer, etc.). The vibration and angular displacement measurements are synchronized.

For the purposes of illustrating the method, we consider that such vibration and angular displacement signals are recorded from the example test case gearbox.

Step S4

At Step S4 order domain analysis is performed. A method well known in the state of the art, one approach to conducting order domain analysis involves scaling the vector of time instances at which the vibrations are recorded by the instantaneous rotation frequency (in Hz) at which the gearbox shaft is rotating (as ascertained from the shaft mounted sensor). This allows the vibrations to be given as a function of angular displacement. The vibrations given as a function of angular position may be resampled to occur at linear intervals of angular position. Subsequently the DFT (Discrete Fourier Transform) of the vibration signal is performed. The details of algorithms used to compute the DFT, such as the FFT (Fast Fourier Transform), are well known to those skilled in the art. The DFT operation transforms the signal from the angular displacement domain into a signal in the shaft order frequency domain. The shaft order domain describes the frequency at which a component occurs relative to the rotation speed (i.e. a component at 1 shaft order repeats once every rotation, at 2 shaft orders repeats twice every rotation and so on). The output of the step is the shaft order domain spectrum.

Considering the example test case gearbox, At step S4 the vibrations recorded from the example test case gearbox are resampled with respect to the synchronously recorded angular displacement also recorded from the example test case gearbox, so that they occur at linear intervals of angular position. Subsequently the FFT of the vibration signal was calculated. The result is a frequency spectrum given in the shaft order domain, describing the frequency at which a component occurs relative to the rotation speed (i.e. a component at 1 shaft order repeats once every rotation, at 2 shaft orders repeats twice every rotation and so on).

Step S5

At Step S5 the shaft order domain spectrum is evaluated in order to ascertain whether or not amplitude components exist at the characteristic frequencies. For each potential gear tooth combination, the amplitude of the component in the shaft order domain spectrum at each of the characteristic frequencies calculated at step S2 is extracted. More specifically, the maximum amplitude in a window around each frequency is taken. In order to improve the accuracy of the approach peak estimation techniques known in the state of the art may be utilized. The output of Step S5 is a vector of shaft order domain amplitude components given at the characteristic frequencies for each gear combination.

Considering the example test case gearbox, at step 5, for each potential gear tooth combination, the amplitude of the component in the shaft order domain spectrum at each of the characteristic frequencies calculated at Step S2 is extracted. Example results for the top 50 combinations which most closely match the reported gear ratio are given in FIG. 5.

Step S6

Assuming that gearbox characteristic frequencies do exist in the spectrum, it should be possible to estimate the actual tooth numbers in the gearbox by identifying which combination maximizes the amplitudes of the components related to the GMFs. At Step S6, the summation of the vector of shaft order domain amplitude components given at the characteristic frequencies for each gear combination is calculated. The tooth combination resulting, in the maximum summated value is chosen as the Most likely gear tooth combination for the gearbox.

Considering the example test case gearbox, at Step S6, the summation of the vector of shaft order domain amplitude components given at the characteristic frequencies for each gear combination is calculated. The tooth combination resulting in the maximum summated value is chosen as the most likely gear tooth combination for the gearbox. This information is output to the user. In FIG. 5 this summation is given for the case study. It may be noted that the combination resulting in the greatest value is combination 36, which if cross referenced with FIG. 3, will be found to relate to the correct tooth combination of 44 teeth on the input gear, 28 on the input pinion, 52 teeth on the output gear, 15 teeth on the output pinion.

Step S7

The information about the gear tooth numbers is output to the user via a computer device or via the output unit. Optionally, the gear tooth numbers may subsequently be utilized as part of a condition monitoring algorithm (e.g. in spectral analysis).

Figure 6:
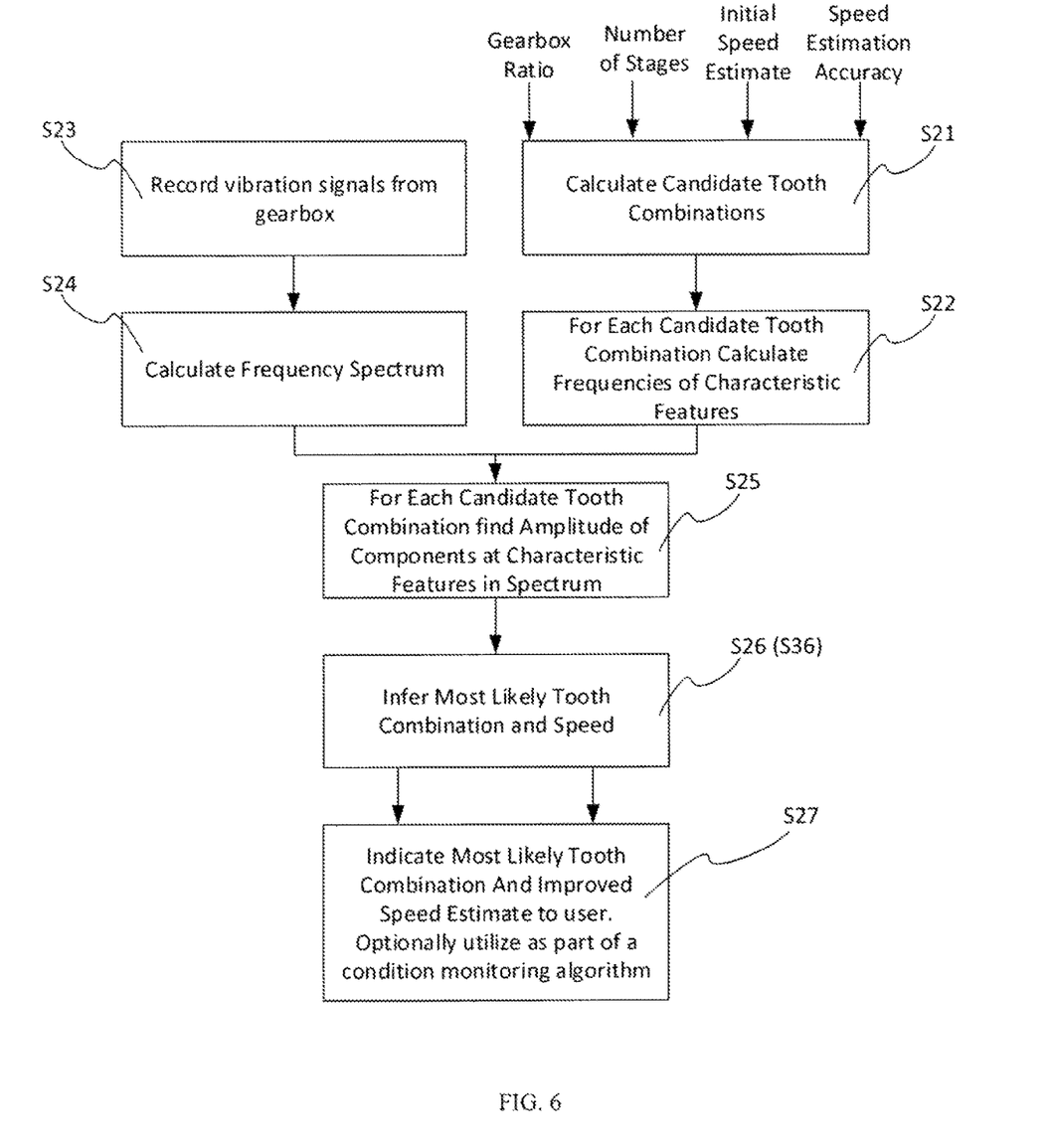
FIG. 6 presents a diagram of operations performed showing the steps taken in the second embodiment of the invention.

In a second embodiment of the invention instead of utilizing a measured angular displacement signal, in a step a scalar estimated speed and a speed estimation accuracy is supplied to the computer device 5 as part of parameter set, as illustrated in FIG. 6. It is not always possible to measure angular displacements from a gearbox (e.g. there is no existing shaft mounted transducer). If there is a connected motor or generator, for which currents and voltages are being recorded, these signals may be used to form an estimate of the rotation speed of the gearbox using methods known in the state of the art. If there is neither an existing shaft mounted transducer nor a connected motor or generator, it is possible to simply provide the system with a scalar estimated speed (e.g. nameplate nominal speed) and a speed estimation accuracy. In this case in the algorithm at Step S22 in addition to the gear mesh frequencies, a range of potential speeds would also form part of the characteristic features calculated. For example, the potential speeds might be calculated as the frequencies in the range scalar estimated speed+/−speed estimation accuracy for which components in the frequency spectrum calculated later at Step S24 exist. These frequencies can be easily calculated at Step S22 using methods known in the state of the art.

If the speed estimation accuracy is +/−E, where E is the potential error in estimation (e.g. related to the resolution in the frequency domain), then the potential error in the estimation of the gear mesh frequency is +/−NE where N is the number of teeth on the gear. However, if the location of a gear mesh frequency is accurately identified using the method described in this document, for example again to an accuracy of +/−E (where E is again assumed to be related to the resolution in the frequency domain), then the speed may be estimated to an accuracy of +/−E/N by dividing the gear mesh frequency by the estimated number of teeth. Hence, using the method the parameters of the gearbox and the speed may be estimated to a greater accuracy, the latter we refer to as an improved speed estimate. Subsequently at Step S23 there is no need for measuring an angular displacement as in step S3 and only vibration signals are measured. Steps S24 and S25 are identical to the steps S4 and S5, but at step S26 a specific calculation of improved speed estimate is also introduced according to the description above. In this situation, as well as the most likely gear tooth combination being calculated, an improved speed estimate may also be output in a step S27. Optionally, both the gear tooth numbers and the improved speed estimate may subsequently be utilized as part of a condition monitoring algorithm (e.g. in spectral analysis).

In both embodiments of the invention the inference step S6 or S26, may be replace by a step S36 at which point the most likely tooth combination is inferred is achieved via a probabilistic model such as Bayesian inference. In this case, the assumptions associated with creating potential gear tooth combinations (Step S1 or Step S21) may allow particular tooth combinations to be ranked according to how suitable they are for the task (e.g. only considering tooth number combinations which result in a feasible gear size, tooth bending strength, standard gear sizes etc.). This would form the a-priori likelihood function of a Bayesian Inference approach, with evidence (in the form of presence of relevant peaks in the frequency spectrum) being used to update the probabilities that a particular combination is the true one. This leads to both an estimate of the tooth numbers and an associated probability, which might be considered as the confidence that estimated tooth numbers are correct.

The invention claimed is:

1. A method for identifying gear tooth numbers in a gearbox using a data obtained from a vibration measuring device delivered to a data acquisition device and data delivered by a user to a computer device, wherein the method comprises:
processing the data delivered by the user to the computer device, where the data comprises a gearbox ratio and a number of stages of the gearbox for calculating a potential gear tooth combination in each stage of the gearbox, calculating frequencies of characteristic features for each potential tooth combination using the data delivered at said processing data, measuring vibration signals and an angular displacement signal of the gearbox, calculating a frequency spectrum from measured data delivered at said measuring, determining an amplitude of components of the frequency spectrum delivered at said calculating the frequency spectrum at frequencies of characteristic features for each potential tooth combination delivered at said calculating frequencies of characteristic features, determining the tooth numbers in the gearbox by identifying which potential gear tooth combination maximizes the amplitudes of the components of the frequency spectrum at frequencies of characteristic features, and outputting the tooth numbers in the gearbox in the computer device or in an output unit connected to the computer device.

2. The method according to claim 1, wherein in said measuring the vibration and angular displacement signals are synchronized.

3. The method according to claim 1, wherein in said determining the amplitude of components, a summation of a vector of shaft order domain amplitude components given at characteristic frequencies for each gear combination is calculated.

4. The method according to claim 1, wherein at the processing data act, all potential gear tooth combinations are ranked according to a likelihood of being a true gear tooth combination of the gearbox.

5. The method according to claim 4, wherein a part of the potential gear tooth combinations is disregarded or given a reduced likelihood weighting.

6. A method for identifying gear tooth numbers in a gearbox using a data obtained from a vibration measuring device delivered to a data acquisition device and data delivered by a user to a computer device, wherein the method comprises:

preprocessing the data delivered by the user to the computer device where the data comprises a gearbox ratio, a number of stages of the gearbox, an initial estimated speed of the gears and a speed estimation accuracy for calculating a potential gear tooth and potential speed combination in each stage of the gearbox and a gearbox ratio for each stage, calculating frequencies of characteristic features for each potential gear tooth and potential speed combination using the data delivered at said preprocessing act, measuring vibration signals of the gearbox, calculating the frequency spectrum from the measured data delivered at said measuring, determining an amplitude of components of the frequency spectrum delivered at said calculating a frequency spectrum at frequencies of characteristic features for each potential gear tooth and potential speed combination delivered at said calculating frequencies, determining the tooth numbers in the gearbox and an improved speed estimate by identifying which potential gear tooth and potential speed combination maximizes the amplitudes of the components of the frequency spectrum at frequencies of characteristic features, and outputting the tooth numbers in the gearbox and an improved speed estimate in the computer device or in an output unit connected to the computer device.

7. The method according to claim 6, wherein in said determining the tooth numbers, a summation of a vector of shaft order domain amplitude components given at characteristic frequencies for each gear combination is calculated.

8. The method according to claim 6, wherein in said preprocessing the data, all potential gear tooth combinations are ranked according to a likelihood of being a true gear tooth combination of the gearbox.

9. The method according to claim 8, wherein a part of potential gear tooth combination is disregarded or given a reduced likelihood weighting.

10. An apparatus for identifying gear tooth numbers in a gearbox, the apparatus comprising a vibration measuring device equipped with a data acquisition unit, a computer device, and an output unit, wherein the computer device is configured to:

process data delivered by a user to the computer device, where the data comprises a gearbox ratio and a number of stages of the gearbox for calculating a potential gear tooth combination in each stage of the gearbox, calculate frequencies of characteristic features for each potential tooth combination using the data delivered at said processing data, measure vibration signals and an angular displacement signal of the gearbox, calculate a frequency spectrum from measured data delivered at said measuring, determine an amplitude of components of the frequency spectrum delivered at said calculating the frequency spectrum at frequencies of characteristic features for each potential tooth combination delivered at said calculating frequencies of characteristic features, determine the tooth numbers in the gearbox by identifying which potential gear tooth combination maximizes the amplitudes of the components of the frequency spectrum at frequencies of characteristic features, and output the tooth numbers in the gearbox.

11. The apparatus according to claim 10 wherein the computer device comprises the data acquisition unit and/or the output unit.

12. An apparatus for identifying gear tooth numbers in a gearbox, the apparatus comprising a vibration measuring device equipped with a data acquisition unit, a computer device, and an output unit, wherein the computer device is configured to:

preprocess the data delivered by a user to the computer device where the data comprises a gearbox ratio, a number of stages of the gearbox, an initial estimated speed of the gears and a speed estimation accuracy for calculating a potential gear tooth and potential speed combination in each stage of the gearbox and a gearbox ratio for each stage, calculate frequencies of characteristic features for each potential gear tooth and potential speed combination using the data delivered at said preprocessing act, measure vibration signals of the gearbox, calculate a frequency spectrum from the measured data delivered at said measuring, determine an amplitude of components of the frequency spectrum delivered at said calculating the frequency spectrum at frequencies of characteristic features for each potential gear tooth and potential speed combination delivered at said calculating frequencies, determine the tooth numbers in the gearbox and an improved speed estimate by identifying which potential gear tooth and potential speed combination maximizes the amplitudes of the components of the frequency spectrum at frequencies of characteristic features, and output the tooth numbers in the gearbox and an improved speed estimate.

\* \* \* \* \*